United States Patent [19]
Dunaway et al.

[11] Patent Number: 5,744,544
[45] Date of Patent: *Apr. 28, 1998

[54] HIGH SOLIDS COPOLYMER DISPERSION FROM A LATEX AND ITS USE IN SEALANTS

[75] Inventors: James H. Dunaway, Cuyahoga Falls; Pamela K. Hernandez, Brunswick; Gregory P. Bidinger, Copley; Biing-Lin Lee, Broadview Heights, all of Ohio

[73] Assignee: The B.F.Goodrich Company, Akron, Ohio

[*] Notice: The term of this patent shall not extend beyond the expiration date of Pat. No. 5,541,253.

[21] Appl. No.: 690,288

[22] Filed: Jul. 26, 1996

Related U.S. Application Data

[63] Continuation-in-part of Ser. No. 321,288, Oct. 11, 1994, Pat. No. 5,541,253.

[51] Int. Cl.$^6$ .................................................. C08L 31/02
[52] U.S. Cl. ........................................... 524/832; 524/833
[58] Field of Search .................................. 524/832, 833, 524/839

[56] References Cited

U.S. PATENT DOCUMENTS

| | | |
|---|---|---|
| 2,111,266 | 12/1938 | Gibello . |
| 3,513,121 | 5/1970 | Heaton . |
| 3,551,374 | 12/1970 | Reinhard et al. . |
| 3,616,166 | 10/1971 | Kelley . |
| 3,707,585 | 12/1972 | Okamoto et al. . |
| 4,011,388 | 3/1977 | Murphy et al. . |
| 4,125,700 | 11/1978 | Graham . |
| 4,130,523 | 12/1978 | Hoy et al. ............................. 523/305 |
| 4,135,043 | 1/1979 | Kast et al. . |
| 4,269,959 | 5/1981 | Lawton . |
| 4,395,500 | 7/1983 | Lohr et al. . |
| 4,456,726 | 6/1984 | Siol et al. . |
| 4,495,318 | 1/1985 | Howard . |
| 4,656,218 | 4/1987 | Kinoshita . |
| 4,668,730 | 5/1987 | Iovine et al. . |
| 4,680,200 | 7/1987 | Solc . |
| 4,707,515 | 11/1987 | Gilch et al. . |
| 4,713,420 | 12/1987 | Henton . |
| 4,721,748 | 1/1988 | Iovine et al. . |
| 4,783,502 | 11/1988 | Faler et al. ............................ 524/871 |
| 4,794,065 | 12/1988 | Hedvall et al. . |
| 4,810,763 | 3/1989 | Mallya et al. . |
| 4,870,143 | 9/1989 | Hashiguchi et al. . |
| 5,037,880 | 8/1991 | Schmidt et al. . |
| 5,051,464 | 9/1991 | Johnson et al. ...................... 524/555 |
| 5,133,992 | 7/1992 | Nair et al. . |
| 5,352,720 | 10/1994 | Aydin et al. . |
| 5,442,006 | 8/1995 | Aydin et al. . |
| 5,541,253 | 7/1996 | Dunaway et al. ..................... 524/832 |

FOREIGN PATENT DOCUMENTS

| | | |
|---|---|---|
| 0 259 734 A2 | 3/1988 | European Pat. Off. . |
| 0 439 941 A1 | 8/1991 | European Pat. Off. . |
| 0 515 719 A1 | 12/1992 | European Pat. Off. . |

OTHER PUBLICATIONS

An article in *Recent Developments in Separations Sciences*, vol. 4, pp. 71–82 (Jan. 1, 1978), published by CRC Press Inc., Boca Raton, FL, USA.

An article in *Journal of Polymer Science*, vol. 50, pp. 123–147 (Jan. 1, 1993), published by John Wiley & Sons, Inc., New York: New York.

An article in *Journal of Paint Technology*, vol. 42, No. 550, pp. 579–587 (Nov. 1, 1970), by Do Ik Lee; Published by Federation of Societies for Paint Technologies: Philadelphia, PA.

An article entitled "Ultra High Solids Copolymer Emulsion for Demanding Applications", by Mary L. Housman et al., published by Intertec Publishing, Atlanta, GA, found in *Adhesive Age*, pp. 49–50, 54, 56–57, 59–60 (Oct. 1, 1995).

*Primary Examiner*—Jeffrey T. Smith

[57] ABSTRACT

A method for polymerizing at least one unsaturated monomer in the presence of a latex results in a high solids dispersion of polymer particles with lower viscosities than traditionally observed. A significant wt. % of the polymer from added monomers can be present in large particles, having nonspherical shapes. Some of the original latex particles are retained during the polymerization and these increase the solids content and lower the viscosity by packing in the interstices between large particles. The total polymer solids content can easily be varied from 70 to 92 or more wt. %. The viscosities at very high solids contents become paste-like but the materials still are stable to storage and further handling without causing the dispersion to separate into an agglomerated polymer portion and released water. The dispersions are useful to form sealants, membranes, etc., either with or without other additives. A preferred use is as an acrylate water-based caulking compound where the high solids and thixotropy of the dispersion allows for formation of a water-based caulk with low shrinkage.

27 Claims, 1 Drawing Sheet

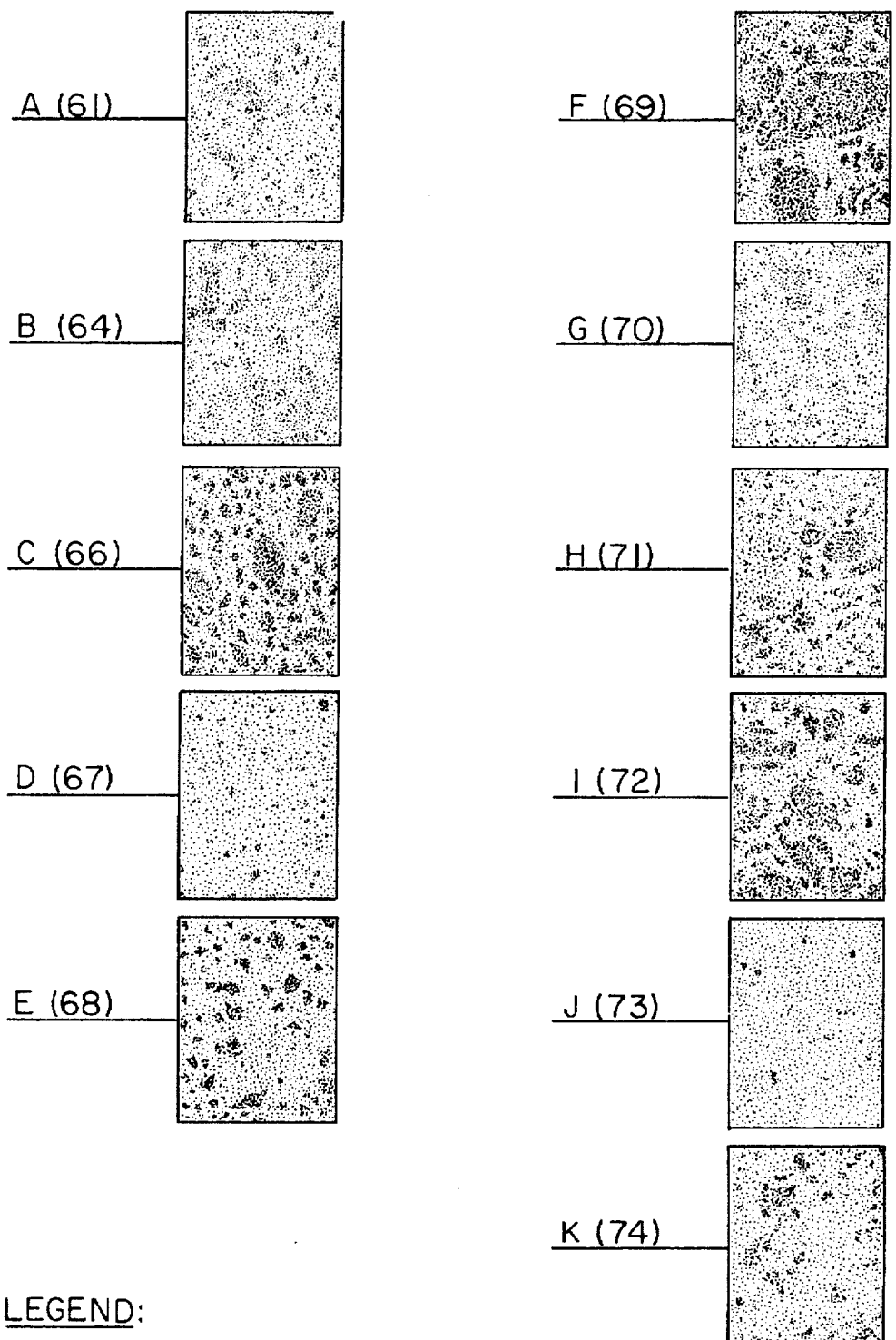

HIGH SOLIDS COPOLYMER DISPERSION FROM A LATEX AND ITS USE IN SEALANTS

CROSS-REFERENCE

This application is a continuation-in-part of U.S. application Ser. No. 08/321,288, filed Oct. 11, 1994, now U.S. Pat. No. 5,541,233 for "High Solids Copolymer Dispersion From a Latex and its Use in Sealants".

FIELD OF INVENTION

This invention relates to high solids, free radical polymerizations of unsaturated monomers such as acrylate and/or vinyl acetate monomers in a latex resulting in high solids (desirably greater than 50 wt. %, preferably 70–95 wt. %) dispersion of polymer particles. The monomer composition polymerized in the presence of the latex need not be similar to the composition of the monomers used to make the latex and may be chosen to modify the properties of dried films from the dispersion. The high solids makes the material economical to ship or store and if formulated into a caulking sealant results in a sealant with desirable properties such as low modulus, high elongation and low shrinkage.

BACKGROUND

Traditionally, higher performance sealants and caulks have been formulated using solvent based polymer systems such as silicone and polyurethane polymers as the binder for the sealant formulation. These solvent based types of sealant formulations generally yield sealants with good application properties (thixotropy and viscosity) and in the cured form typically have the elastomeric properties and adhesion required for a high performance sealant or caulking material. However, in recent years, with increasing government regulation and heightened consumer awareness, the manufacturers of solvent based sealants are coming under increasing pressure to reduce the VOC (volatile organic content) of their product (i.e. organic solvent content).

Dispersions of polymer particles in water have been used extensively in water-based sealants such as coatings and caulking. Their low viscosity, low volatile organic emissions, and ease of application have been favorable factors for their use. However, irrespective of the polymer particle sizes there has been a barrier at from 40–65% solids (depending on emulsifier type and other conditions) above which dispersions of polymer particles are difficult to prepare. Therefore high solids sealants were made by adding fillers. The fillers dilute the polymer in the final application lowering elongation and increasing modulus. Polymers having low Tg values (such as below 0° C.) are particularly useful in sealants and caulk formulations requiring low temperature flexibility.

One example of high solids polymerization is European Patent Publication No. 0 515 719 A1, which discloses a self-adhering acrylate copolymer, which can be used for the production of self-adhering surface layer formulations. This acrylate copolymer is produced by a combined suspension and emulsion polymerization. The solids content recited are 30–70 wt. % and the examples show 65 wt. % solids.

An article by Do Ik Lee in the Journal of Paint Technology, Vol. 42, No. 550 (1970) pp 579–587 discusses the packing of binary mixtures of spheres.

U.S. Pat. No. 4,130,523 to Hoy and Peterson discloses nearly 70 volume % solids. Their latex particles are desirably no larger than 1.5 microns in diameter.

It is the object of the current application to polymerize in the presence of a preformed latex additional monomers creating a high solids, low viscosity, thixotropic product especially useful in coatings and sealants.

SUMMARY OF THE INVENTION

It has been found that a latex dispersion of latex polymer particles, when used as the medium for a further polymerization, can result in high solids content (such as 70–95 wt. %) polymer particle dispersions with lower viscosities than achieved with traditional polymerization. The resulting dispersions show bimodal or multimodal particle size distributions with particle diameters ranging from around 0.05 to 100 microns. The resulting broad particle size distribution, and good mixing during polymerization are believed to be major factors allowing high solids contents to be achieved.

Upon removal of shear, the polymer particle dispersions thicken but are capable of being shear thinned. The large particles (above 4 μm) when formed are typically nonspherical, desirably having an average aspect ratio between the largest and smallest diameter of each particle of at least 1.5. The ability of these large particles to take nonspherical shapes has been associated with polymers having a Tg value of below 15°, 0°, or −20° C.

BRIEF DESCRIPTION OF THE FIGURES

FIG. 1 shows acrylate dispersions made similarly to Examples 1–3 at a magnification of about 675×. Table V shows the specific pH and weight percent solids of A–K from FIG. 1. The breadth of the particle size distribution and variation in shape of the particles are easily seen by this microscopic examination technique which sandwiches a drop of the polymer dispersion between two microscope slides.

DETAILED DESCRIPTION OF THE INVENTION

High solids polymer particle dispersions are created by polymerizing monomers in the presence of a latex (i.e., using the latex as the polymerization medium). A latex, as specified herein, is defined as a dispersion of small polymer particles (i.e. weight average particle diameters of less than 2 μm) in a water-based media. The latex serves as a primary source of the smaller particles in the final dispersion of particles. The latex also serves as the water-based media for further polymerization. The latex can be formed by emulsion polymerization of unsaturated monomers or by dispersing a preformed polymer (such as a urethane polymer) in an aqueous media.

Also, mixtures of latexes can be used as the starting material giving even more flexibility to the composition and properties of the final dispersion and films or caulks derived from the dispersion. Such dispersions are usually thixotropic, especially at solids above 75 percent by weight. The thixotropy enhances the uses of the polymer in sealant applications where the material is applied with a low viscosity at a high shear rate. The material can have a high viscosity and thus resist flow (such as runoff) under low shear conditions. Preferred polymers for the process and sealants include poly- (acrylate), poly(vinyl acetate), and copolymers or combinations thereof having low Tg values.

The monomers polymerized in the presence of the latex are desirably added over a period of time such as by metering them into the latex or metering the latex and monomers simultaneously. The preferred monomers have low water solubilities (i.e., less than 5 wt. % soluble in water) such that dispersed monomer droplets are formed. These droplets can be converted into polymer particles by polymerization. The large polymer particles ultimately created in this polymerization, vary from about 2 to about 200 µm in diameter. The solids content of the dispersion of polymer particles is desirably at least 50, 60, 65, 75, 77 or 80 wt. %. Desired ranges are also from 70 to 95 wt. % or 75 to 85, 88, 90 or 92 wt. % of the dispersions.

The technique of adding monomer to a preformed latex can be conducted with any latex preferably an acrylate or vinyl acetate based latex. The viscosity of the dispersion will generally be lower than similar dispersions made by other sequences of emulsion and suspension polymerization. When the starting latex has from 40 to 68% solids, the resulting dispersion of polymer particles can have greater than 70 wt. % or preferably 75 to 92 wt. % solids.

The starting latexes with from 40 to 68 weight percent solids may vary from standard emulsion polymerized latexes because they are often bimodal or multimodal. This is because wide particle size distributions or multimodal distributions are known to have lower (processable) viscosities at high solid levels. The higher solids starting latexes can be readily achieved by shifting the diameter of one or more modes or increasing or decreasing the amount of particles of one or more particle diameter. The technology to create broad or multimodal distributions is disclosed in European Patent Publication No. 0 515 719 A1 and U.S. Pat. No. 4,130,523, both further identified in the Background of this application and hereby incorporated by reference. A review article entitled "Concentrated Colloidal Dispersions", Faraday Discussions of the Chemical Society, No. 76, published by the Royal Society of Chemistry, London 1983 is hereby incorporated by reference and, further describes various ways to prepare high solids latexes.

Commercially available high solids latexes are available under the name Rhoplex™ 2620 from Rohm and Haas at 62 weight percent solids being an acrylate latex; under the designation Carbobond™ XPD 2254 available at about 67 percent solids from The BFGoodrich Company, Brecksville, Ohio, which was used in Examples 1–4; and under the name Acronal V275™ available from BASF at 65 weight percent solids. The Acronal V275™ varies from the other two acrylate latexes in having a few weight percent of acrylonitrile included in the polymer. Commercially available carboxylated styrene-butadiene latex, carboxylated butadiene-acrylonitrile latex, non-carboxylated butadiene-acrylonitrile latex, urethane latex, polyvinyl chloride copolymer, and poly(vinylidene chloride) copolymer latex are also used in the examples either as the only latex or in a 50:50 blend with an acrylate latex. With some of the latexes in the preceding sentence comprising monomers such as styrene alkyl substituted styrene, butadiene, acrylonitrile, vinyl chloride, vinylidene chloride, isoprene, etc. or combinations thereof it is desirable that an acrylic latex be up to 25, more desirably up to 40 or 45 wt. % and preferably up to 50 wt. % of the starting latex on a solids basis. This means the non-acrylic latex is up to 75, more desirably up to 55 or 60 wt. %, and preferably up to 50 wt. %. When non-acrylic latexes are used desirably their wt. % on a solids basis of the total latex solids is at least 10, 15, or 20%.

During the polymerization in the presence of the latex, new small particles (less than 0.5 µm and sometimes less than 0.10 µm in diameter) have been observed initially. At a certain solids content (depending on many factors such as the emulsifiers, monomers of the latex, and monomers added during the polymerization) the relative number of new small particles appears to decrease (presumably due to agglomeration) and larger particles (greater than 2 µm diameter) are observed in greater numbers. The agglomeration of small particles into larger particles seems to occur in a controlled manner without the formation of coagulum (which would be expected in typical polymer dispersions in water when agglomeration occurs). Although the above particles are often seen the method of polymerization does not require their presence. In Examples 1 and 2, the larger particles are in the 2 to 4 µm diameter range while in the later examples the particles exist at modes in diameter from 2 to 4 and 8 to 30 µm in diameter. Thus, Examples 1 and 2 show bimodal distributions while Examples 3 and 4 show trimodal distributions of particle diameters.

These high solids polymer dispersions are particularly useful for sealants, especially caulking-type water-based sealants. The evaporation of water from conventional low solids water-based caulks during curing causes extensive undesirable shrinkage. The shrinkage in water-based caulking results in residual stresses and strains which may cause the caulking to pull away from one or more of its bonded surfaces. By decreasing the relative amount of water in caulking formulations one can decrease the maximum water loss and maximum amount of shrinkage. When a caulking formulation starts with a higher solids polymer dispersion, the final caulk can achieve still higher solids content with the addition of nonvolatile fillers. Alternatively the caulking formulation may achieve equivalent solids content with less fillers. This usually results in a caulking formulation with higher elongation, lower modulus, and increased adhesion to the substrate.

The viscosity of a caulk increases with the addition of particulate solids to low solids polymer dispersions. The addition of large amounts of particulate solids to a water based caulking formulation greatly increases the modulus and decreases the ultimate elongation at break of the cured formulated caulking compound and therefore reduces the performance of the caulking material.

The viscosities of these dispersions vary with solids content but are generally lower than those produced by other aqueous polymerizations. For a 75 wt. % or more solids dispersion the viscosity is desirably less than 30,000 cps at 24° C., 20 rpm, with a cone and plate viscometer. More desirably the viscosity is less than 20,000 cps. At 70 to 80 wt. % solids the viscosity is desirably less than 10,000 cps under the same measuring conditions.

Preferred monomers for the latex and/or the polymerization in the presence of the latex are one or more alkyl acrylates having 4 to 16 or desirably 4 to 12 carbon atoms such as ethyl, butyl, and ethylhexyl acrylate and/or vinyl acetate. Alkyl (alkyl)acrylates are included in the general terms the alkyl acrylates although they tend to have higher glass transition temperatures. Preferably, the polymers in either or both the latex polymer particles or the larger polymer particles have at least 50, 70, 75, 80, or 90 wt. % of their repeat units derived the alkyl acrylates or vinyl acetate and preferably just alkyl acrylates. Such acrylates are derived from the esterification of one or more (alkyl) acrylic acids, such as methacrylic acid and one or more alkyl alcohols having 1 to 12 carbon atoms. Also preferred for the principal polymer as specified above (i.e., at least 50, 60, 70, 80, or 90 wt. % thereof) is that it be a substantially non-crystalline polymer (e.g. elastomeric or behaving as an elastomer at 20° C.) having a Tg of 0° C. or less and preferably −20° C. or less. These type polymers when properly cured can have reversible elongations of 200 percent or more and are thus called elastomers.

Other monomers that can be used include the ethylenically unsaturated monomers. These include monomers having from 3 to 16 carbon atoms and optionally one or more heteroatoms of O, N, Cl and/or F. These include the conjugated dienes (preferably 4 to 8 carbon atoms); other monomers having carboxylic acid or ester functionality such as di-n-butyl maleate; acrylic acid; maleic anhydride; isobutyl itaconate; acrylonitrile; (alkyl)acrylonitriles; acrylamides; and derivatives thereof; alpha-methylstyrene, styrene, vinyl chloride, vinylidene chloride, vinyl propionate and other higher esters of the vinyl acetate family having from 4 to 30 carbon atoms. Multifunctional monomers capable of crosslinking such as diacrylates or divinylbenzene may also be used. Other monomers also include functionalized acrylates having from 4 to 16 carbon atoms such as acrylates having pendant carbon-carbon double bonds or pendant epoxy rings. These above listed monomers may optionally be present in the latex used as polymerization media. These monomers are desirably present in complementary amounts to the acrylates and vinyl acetate (i.e. 100%—the wt. % acrylates and/or vinyl acetate).

In some embodiments it is desirable to incorporate monomers forming homopolymers having Tg values above 50° C. such as styrene and substituted styrene, alkyl methacrylates or ethacrylates and acrylonitrile. A substantial portion of these monomers can be in the starting latex and still result in an acceptably low Tg for the latex copolymer. For example up to 40 or 50 wt. %, more desirably up to 30 or 35 weight percent of the monomers of the polymer of the starting latex may be monomers that form high Tg homopolymers such as vinyl chloride; styrene or alkyl substituted styrene having from 6 to 12 carbon atoms; alkyl meth or ethacrylate having from 5 to 10 carbon atoms; or acrylonitrile or alkyl substituted acrylonitrile having from 3 to 8 carbon atoms or combinations thereof. In embodiments using repeat units from these monomers desirably at least 5, 10, or 15 wt. % repeat units from these monomers are present. Desirably these additional monomers copolymerize with the monomers forming lower Tg polymers so the monomers forming high Tg homopolymers do not form large amounts of high Tg homopolymers, e.g., less than 10 wt. %, more desirably less than 5 wt. % and preferably less than 2 or 1 wt. % of the final polymer dispersion. If the monomers forming high Tg homopolymers (e.g. Tg>50° C.) are used in combination with other monomers for the polymerization in the presence of the latex then their amount is desirably limited to less than 25 wt. % of the total monomers used in the polymerization, more desirably less than 20 wt. % and preferably 15 wt. % or less. In embodiments using these monomers desirably at least 5 or 10 wt. % repeat units from these monomers are present. As specified above it is very desirable that the monomers, which form high Tg homopolymers, copolymerize with other monomers thereby not forming significant amounts of high Tg homopolymers. These monomers may be used both in the latex and as added monomers.

In some embodiments it is desirable to incorporate monomers forming moderate Tg homopolymers such as those having a Tg from −20° C. to 50° C. Such monomers include vinylidene chloride and vinyl esters having from 4–10 carbon atoms such as vinyl acetate or combinations thereof. If these monomers are incorporated in the polymer of the latex their amount is desirably up to about 80 or 85 wt. % of the polymer of the latex more desirably up to 65, 70, or 75 wt. %. In embodiments using these monomers desirably at least 5, 10 or 15 wt. % of the repeat units are from these monomers. If these monomers forming moderate Tg homopolymers are used in the monomer mixture polymerized in the presence of the latex then their amount is desirably up to about 65 wt. % of the added monomers, more desirably up to about 55 or 60 wt. %. The monomers forming moderate Tg polymers may be used in both the latex and as added monomers. As set forth for the other monomer it is desirable that these monomers copolymerize so they do not form a substantial amount of homopolymer with a higher Tg or modulus than those set forth as being desirable for the dispersion.

The starting latex may also be a preformed polymer dispersed as particles in water forming a latex. An example of such a latex is Sancure® 2026 a urethane latex formed from polyester polyols and diisocyanates. Urethane latexes are characterized as being formed from polyols and diisocyanates and they have urethane linkages from the reactions thereof.

Desirably, the monomers used in the polymerization include 10% or less desirably 7 wt. % or less of the highly water soluble monomers (i.e., those with solubilities in water of 5 or 10 wt. % or greater). Examples of the limited highly water soluble monomers include olefinic monoacids having 3 to 10 carbon atoms, acrylic acid, olefinic diacids having 4 to 12 carbon atoms, and acrylonitriles having 3 to 10 carbon atoms.

The preferred media for the latex is water or blends thereof which blends are substantially (i.e., 70, 80, 90 or more wt. %) water. Solvents may be used in small amounts in the blend such as alcohols, glycols, chlorinated alkyls, etc.

The emulsifiers (a term which includes surfactants) useful in the latex or the latex polymerization are the commercial anionic emulsifiers commonly used for emulsion polymerizations such as alkyl sulfonates or polysulfonates; olefin or polyolefin sulfonates or polysulfonates; and carboxylates or polycarboxylates made from alkyls, olefins, or polyolefins. Other emulsifiers such as nonionic or cationic emulsifiers can be used, or blends of anionic and nonionic emulsifiers can be used. Polymeric emulsifiers, formed during the reaction or added separately may also be used. The nonionic and cationic emulsifiers are desirably used in lesser amounts such as less than 50 wt. %, 30 wt. %, or 10 wt. % of the total emulsifiers at any time in the dispersion of polymer particles in some embodiments. In other embodiments the nonionic emulsifiers may be used in larger amounts where they provide colloidal stabilization and possibly act as a plasticizer lowering the Tg of the polymer. Desirably, the emulsifiers are less than 10 wt. % and preferably less than 1 or 2 wt. % of the final dispersion of polymer particles.

Any conventional chain transfer agents for emulsion, dispersion, or suspension polymerization can be used. These additives function to reduce polymer branching and molecular weight, which serves to prevent macromolecular gel formation during polymerization.

The latex used as the medium for the polymerization of the additional monomers desirably has a pH from about 1 to 11 more desirably from 3 to 9, and preferably from about 5 to 7. It is preferred that the pH be adjusted with alkali metal hydroxides selected from Na, Ca, K, and Li; or ammonia; or amines having up to 3 substituents with each substituent having up to 15 carbon atoms. Ammonia is the most preferred.

The initiators for the polymerization of emulsion-sized polymer particles and/or larger polymer particles may be any of those known to the prior art. The initiators for the polymerization may be any of those known to the prior art for free radical polymerization in organic solvents, in bulk, or in aqueous media such as emulsion or suspension polymerization. Preferred initiators include oil soluble azo and peroxy thermal initiators typically used in solution polymerizations in organic solvents such as, but not limited to, 2,2'azobisisobutyronitrile, 2,2'azobis (2,4-dimethylvaleronitrile), 2,2'-azobis(2-methylbutyronitrile), di(2-ethylhexyl) peroxydicarbonate, tert-amyl peroxyneodecanoate, hexylene glycol peroxy neoheptanoate. Water soluble thermal initiators typically used in emulsion polymerization such as, but not limited to, ammonium persulfate can also be used successfully. Redox initiators such as, but not limited to, tert-butyl hydroperoxide or cumene hydroperoxide with sodium formaldehyde sulfoxylate or sodium bisulfite or potassium metabisulfite can also be used successfully. Oil soluble redox initiators such as benzoyl peroxide with N,N-dimethyltoluidine can also be used successfully.

The dispersion of polymer particles desirably has two or more groups of dispersed polymer particles resulting in a broad particle size distribution. One group is polymer particles of a weight average diameter from about 0.05 to 0.7 μm and more desirably from 0.08 to 0.6 μm. Another group is desirably from 0.7 to 4 μm and more desirably from 1.0 to 3.5 or 4 μm. The particles between 0.05 and 0.7 μm and some of the particles between 0.7 and 4 μm will primarily be derived from the latex and are desirably present from about 2 to about 20 wt. %, more desirably from about at least 10 to 20 wt. % of the total polymer particles. In the final dispersion of polymer particles, these particles from the latex will be present (probably in fewer number) as one or more modes in the particle size distribution. These modes in the particle size distribution are desirably present at diameters of from 0.05 to 0.6 or 0.7 μm and from 0.7 to 4 microns, and more desirably from 0.1 to 0.5 and 1.0 to 3.5, and most preferably around 0.3 and 2.0 μm. Thus at least one mode will be less than 1 μm and at least one mode will be greater than 1 μm. Another group of particles will be present having particle diameters greater than from 4 μm to 100 or 200 μm. As these large particles (greater than 4 μm in diameter) are later disclosed to be nonspherical the diameter values recited herein are calculated average diameters for each particle reported by dynamic light scattering particle size measurements. These particles will result in a mode in the particle size distribution desirably from 4 to 100 μm and preferably from 6 to 40 μm. Each of these particle size ranges will have a weight mean particle size. Desirably, the weight mean particle size of the large (greater than 4 μm) polymer particles will be from 5 to 30 times the weight mean particle size of the small (4 μm or less) polymer particles. Desirably, for the higher solids polymer dispersions, at least 5, 10, 15, 60, or 70 wt. % of the polymer of the dispersion are these large particles having a diameter of at least 4 microns and more desirably between 4 and 100 μm. Desirably, at least 70, 80, or 90 wt. % or more of the particles in the dispersion fall into the combined small and large size ranges specified.

The particle size distributions found in the polymer dispersions are different than the normal particle size distributions created by emulsion or suspension polymerizations. In bimodal and multimodal particle size distributions it is possible to have at least 30, 35 or 50 weight percent of the particles having an average diameter greater than 1 μm and more desirably between 1 and 4 μm with the high solids contents previously described. A preferred multimodal distribution is from 5 to 30 weight percent of the particles having diameters between 0.05 and 0.7 μm; 20 to 70 weight percent of the particles having diameters from 0.7 to 4 μm; and 5 to 75 weight percent and more desirably 30 to 75 weight percent having particle diameters from 4 to 100 μm.

The particle diameters referred to herein are those determined by light scattering measurements. These correlate well with measurements by diffusion and sedimentation, column chromatography, and examination in an electron microscope. When average sizes are referred to without a basis, weight average sizes are preferred. A mode in a particle size distribution is used to define a peak or maxima therein. A mode is defined as the predominant diameter present in a peak of the particle size distribution.

The process of this disclosure is the formation of a stable dispersion of polymer particles, by polymerizing unsaturated monomers in a preformed latex. The additional monomer is added either in a batch, by metered addition or added incrementally over a period of time. By this process a substantial portion of the added monomers are converted eventually into large polymer particles (such as from 2, 4, or 6 μm to 200 μm). It is desirable to add the free radical initiator over a period of time (e.g. during the polymerization), or to select free radical initiators that generate an effective level of free radicals over the course of the polymerization.

It is desirable that the monomers be added over a period of time (such as metered in) as from about ½ hour to 24 hours, desirably from 1 hour to 10 hours, and preferably from 1½ to 6 hours. It is also desirable that the selected initiator and polymerization temperature are such that monomers are readily converted to polymer particles during the period over which the monomers are added. Thus, the amount of unpolymerized monomers is minimized within the polymer dispersion and the reaction vessel during the polymerization by incremental or continuous addition of monomer and continuous polymerization of monomers to polymers.

Some of the original latex polymer particles may be lost due to agglomeration or coagulation during this process. However, a significant number of the smaller latex particles, e.g. 4 μm or less, are retained during this process. The presence of at least two substantially different diameter modes in the distribution of particle diameters within one dispersion of polymer particles is partially attributed with achieving solids contents above 70 wt. % in the form of flowable liquids or pastes. Many of the particles above 4 μm formed by the process have a nonspherical shape due to their method of formation. This results in an average aspect ratio for the particles above 4 μm in diameter, desirably above 1.5, and more preferably above 2. The average aspect ratio is the average from a group of particles of the quotient of the largest diameter over the smallest diameter of each particle. These values are usually determined by examination of electron microscope photographs of the particles.

The latex used as the primary source of the polymerization media in one embodiment is desirably a latex derived predominantly from one or more alkyl acrylate and/or vinyl acetate monomers. In other embodiments the latex can be other than acrylate or a copolymer with acrylate(s). The other monomers previously described for use in the polymerization may also be present in the form of polymers or copolymers in the latex. Desirably, in one embodiment the polymers of the latex have at least 50, 70, 80 or 90 wt. % of their repeat units derived from alkyl acrylates and/or vinyl acetate and preferably from alkyl acrylates having from 4 to 16 carbon atoms. The latex desirably is an anionically stabilized latex. That means the latex is primarily stabilized by anionic emulsifiers (a term which includes surfactants). Desirably the latex polymers contain at least 0.05 wt. % repeat units from unsaturated mono and dicarboxylic acid monomers and more desirably from 0.1 or 0.5 to 10 or 20 wt.

%. Unsaturated carboxylic acid monomers include those having up to 12 carbon atoms. Such monomers include acrylic acid, methacrylic acid, itaconic acid, maleic acid and the like. The latex media is desirably 20 to 70 wt. % solids and more preferably 50 to 68 wt. % solids. The term solids refers throughout the specification to the determination of the components which do not readily volatilize within one hour at 105° C.

It is advantageous but not necessary to have two or more stirrers in the reaction vessel. The agitator of the reaction vessel most desirably is one capable of thoroughly mixing and homogenizing high viscosity highly thixotropic materials such as shown in the examples. Sufficient shear is desirable to maintain the thixotropic material in a shear thinned (liquid) state. The nonspherical particles above 4 μm in diameter are typically formed at higher solids where higher shear conditions exist. Thus a relationship between the mixing conditions and particle morphology is suggested. The agitator is desirably designed to come in close contact with the reactor walls and to thoroughly mix materials inside the reactor. An anchor type mixing blade is desirable.

In some embodiments no additional emulsifiers are added with the additional monomers. It is believed that some of the emulsifiers from the latex are desorbed from the small particles and are adsorbed onto the monomer droplets and large polymer particles. It is recognized that sufficient emulsifier must be present to stabilize the particles against catastrophic coagulation. Thus, if insufficient emulsifier is present in the latex, additional emulsifier can be added during or after the monomer addition or prior to the addition of monomers.

The term thixotropic has been used to define the dispersion of polymer particles. The thixotropic dispersion refers to a dispersion wherein the measured viscosity decreases by a factor of from 5 to 1,000 when the shear rate (rpm) of the viscometer used to test the viscosity is increased from 1 rpm to 100 rpm, more desirably for this process the viscosity varies by a factor from 10 to 800, and preferably from 15 to 200. The viscosities are measured with a Brookfield cone and plate viscometer, Model DVII, at 25° C.

The polymerization temperature for polymerizing the monomers in the latex is desirably from 20° or 40° to 110° C., more desirably from 50° to 100° C., and preferably from 65° to 95° C.

It has been observed that the polymerization in the presence of a latex to a high solids dispersion is more easily accomplished with a polymer having Tg value or polymers with Tg values below 15°, 10°, 5°, 0° or −20° C. Desirably at least 70, 80 or 90 wt. % of the polymer of the dispersion has a Tg below the specified value. With very low Tg polymers e.g. <−20° C. the polymerization procedures, including emulsifier amount and type require very little optimization to maintain colloidal stability to high solids content. As the Tg values approach 10° or 15° C. much more optimization is required to maintain colloidal stability. These polymers are desirably substantially non-crystalline meaning they have less than 10, 5, or 2 wt. % crystallinity as measured by X-ray determination. The characterization of the polymer of the dispersion can also be expressed by the modulus of the polymer at 20° or 25° C. (about room temperature).

Polymers are in a rubbery state above their Tg value. Therefore the desired polymers of the dispersion are in a rubbery state (if not crosslinked) during the polymerization (their Tg is below the polymerization temperature). This rubbery state is associated with a polymer modulus of about $10^7$ or less, more desirably $10^6$ or less, and preferably from about $10^5$ dynes/cm$^2$ to about $10^6$ dynes/cm$^2$ at 20° or 25° C. This modulus and Tg of the polymers is also defined as the modulus or Tg of the polymer as plasticized by any monomers, absorbed surfactants, and other plasticizing chemical compounds. Thus, if optional plasticizing agents are in the polymerizations the Tg of the polymer as defined herein can be lower than the Tg of the purified polymer. It is desirable that the plasticizer be thermodynamically compatible with the polymer(s) so that the plasticizer(s) and polymer(s) do not phase separate, possibly destabilizing the dispersion, during storage. The modulus is the modulus of the polymer and any plasticizing agents present in the polymer as measured by a dynamic mechanical testing using a parallel plate mode test. The values reported were measured with a Rheometric™ unit having two one inch diameter discs.

According to theories on suspension and emulsion rheology the cited Tg values and modulus values should enable the particles having diameters above 1 μm to deform into the non-spherical shapes observed in the high solids dispersion. The deformable non-spherical particles apparently facilitate closer packing of the particles than can be achieved with polymodal particle size distributions. Closer packing of the particles facilitates higher solids content with processable viscosities. The theories on suspension rheology suggest particles with diameters below 0.5 μm, will retain spherical shape irrespective of Tg or modulus of the polymer. Thus suspensions of polymer particles of less than 0.5 microns in diameter are treated as rigid particle. Having only spherical particles appears to limit the polymer solids to less than 77 wt. %

It has been observed that the latex particles and the polymer formed from the added monomers need not be thermodynamically compatible. This is supported by the multiple Tg values in the final polymer of the dispersion with each Tg being characteristic of a different homopolymer or copolymer.

Accordingly, the preferred polymer dispersions of this disclosure will have a majority of the polymer (both from the latex and the added monomers) having a Tg of the specified value or below or alternatively a polymer modulus of the specified value or less at 20° or 25° C.

The polymerization of this disclosure could also be done in a continuous polymerization. In a continuous polymerization a heel of previously formed polymer would be added to the reactor and heated to the proper reaction temperature under a nitrogen blanket. Both the monomer solution and latex would then be pumped into the reactor at an appropriate rate and reacted polymer would be pumped out of the bottom of the reactor at a rate matching the combined rate of the latex and monomer addition. This type of reaction scheme would be very similar to a CSTR (continuous stirred tank reactor) set up. A plug flow type reactor could also be used.

The above dispersions can be formulated in low shrinkage caulking formulations, especially water-based low volatile organic or volatile organic free formulations. The caulking formulation may include inorganic fillers such as chalk, talc, titanium dioxide (available in many forms as a white pigment), zinc oxide and kaolin clays. These fillers may be present at concentrations up to 70 wt. % of the solids. The caulking formulation may include various plasticizers such as low molecular weight (i.e. less than 10,000; 20,000; or 30,000 weight average molecular weight) polymers or oligomers which are compatible with the one or more polymers of the polymer dispersion. They serve to soften the polymer composition. The caulking formulation may include biocides (such as fungicides and mildewcides), U.V. stabilizers, antioxidants, adhesion promoters, viscosity modifiers (which increase or decrease viscosity) coalescing agents, and crosslinking agents. Preferably, at least 60, 70, 80, or 90 wt. % of the solids of the caulking formulation are the polymeric particles of the dispersion. (Note that solids here refer to nonvolatiles components at 105° C. for 1 hour.) Desirably the caulking releases less than 25 or 30, preferably less than 20 or 15 wt. % volatiles, (organic and water) on drying at 105° C. for 1 hour. Desirably the caulk has an extrudability by ASTM D2452 at 20 psi with a 0.104" orifice of less than 400 seconds at 25° C., more desirably from 10 to 400 seconds, and preferably from 20 to 100 or 200 seconds. The polymer dispersion may have polymers having 2 or more separate Tg values. Low Tg values are desirable for low temperature flexibility; however, they can be tacky at higher temperatures. By selecting the appropriate monomers for the latex and polymerization two or more phase separated polymers may be present in the caulk giving two Tg values and both low temperatures flexibility and low tack in one formulation.

EXAMPLES

Examples 1, 2, 3 and 4 show how acrylate polymer dispersions were prepared at 72, 79, 80, and 87 percent solids. Example 5 shows an acrylate and vinyl acetate copolymer dispersion.

GENERAL PROCEDURE A

A 50:50 solution of the deionized water and concentrated ammonium hydroxide (29–30 wt. % $NH_3$) was prepared and added dropwise to a carboxylated latex (acrylate or vinyl acetate copolymer latex) with vigorous stirring to adjust the pH of the latex to about 6.0. The partially neutralized latex was then added to a reactor and stirred under nitrogen at 100 rpm. In a typical lab preparation a 4 liter jacketed resin kettle was used as the reactor. A low speed, high torque electrically powered stirrer equipped with an anchor type blade was used for agitation. The temperature was controlled using an external heating/cooling bath which circulates a water/glycol mixture through the resin kettle jacket. The latex was heated to 75° C. and a solution of the lauryl mercaptan, t-amyl peroxyneodecanoate, ethyl acrylate, and butyl acrylate was added over a 1.5 hour period. The batch temperature was maintained in the 75°–85° C. range throughout the addition. Fifteen minutes after addition was complete, the t-butyl hydroperoxide (1.43 g) was added and cooling was begun. The t-butyl hydroperoxide was the first half of the red-ox scavenging system used to reduce the level of unreacted free monomer to an acceptable level. When the batch temperature reached 50° C., a solution of 33.3 wt. % sodium formaldehyde sulfoxylate, deionized water and 33.3 wt. % anionic surfactant was added. The sodium formaldehyde sulfoxylate catalyzes the t-butyl hydroperoxide causing it to form free radical containing species which react with any residual free monomer. The batch was stirred for 1 hour more at 50° C. during which time the residual monomer was scavenged (consumed), then cooled to room temperature and removed from the reactor. The resultant polymer was very thixotropic. The particle size distribution was multimodal. The glass transition temperatures were measured using a heating/Perkin Elmer Model D5C7 differential scanning calorimeter using a heating/cooling rate of 10° C./minute.

The starting latex media for Examples 1, 2, 3 and 4 is a carboxylated acrylic latex having a solids content of about 66 weight percent and a pH of about 2 and a viscosity of about 200 cp. It is commercially available from The BFGoodrich Company under the tradename Carbobond™ XPD 2254.

Example 1

This example used carboxylated acrylic latex Carbobond™ XPD 2254 and a 50:50 blend of ethyl acrylate and butyl acrylate monomers by weight. It used General Procedure A with the recipe of Table I.

TABLE I

| 72.0 Percent Solids Acrylate Polymer | | |
|---|---|---|
| REAGENT | WEIGHT (g) | WEIGHT (%) |
| Latex (67.3% solids) | 4545 | 84.36 |
| Ammonium hydroxide (29–30 wt. %) | 21.5 | 0.40 |
| Deionized water | 21.5 | 0.40 |
| Lauryl mercaptan | 0.79 | 0.01 |
| t-Amyl peroxyneodecanoate | 3.11 | 0.06 |
| Ethyl acrylate | 390 | 7.24 |
| Butyl acrylate | 390 | 7.24 |
| t-Butyl hydroperoxide | 1.43 | 0.03 |
| Sodium formaldehyde sulfoxylate | 2.86 | 0.05 |
| Deionized water | 8.58 | 0.16 |
| Anionic surfactant * | 2.86 | 0.05 |

* ABEX JKB ™ manufactured by Rhone-Poulenc

The final dispersion had a cone and plate viscosity (Brookfield Model No. DVII) of 600 cps at 100 rpm (75° F.) and 4,500 cps at 1 rpm (75° F.). The particle size distribution of this dispersion was typically bimodal with one mode centered at 0.4 to 0.7 microns and another mode centered at 1 to 3 microns. Fully coalesced and dried films of this dispersion exhibited two glass transition temperatures, one at −21° to −23° C. and one at −30° to −31° characteristic of different acrylate copolymers.

Example 2

This example used the same carboxylated acrylated acrylic latex and monomer blend as Example 1 but went to a higher solids content. It used General Procedure A for polymerization and the recipe is in Table II.

TABLE II

| 79.72 Percent Solids Acrylate Polymer | | |
|---|---|---|
| REAGENT | WEIGHT (g) | WEIGHT (%) |
| Latex (67.3% solids) | 4545 | 60.12 |
| Ammonium hydroxide (29–30 wt. %) | 21.5 | 0.28 |
| Deionized water | 21.5 | 0.28 |
| Lauryl mercaptan | 2.92 | 0.04 |
| t-Amyl peroxyneodecanoate | 11.59 | 0.15 |
| Ethyl acrylate | 1450 | 19.18 |
| Butyl acrylate | 1450 | 19.18 |
| t-Butyl hydroperoxide | 5.32 | 0.07 |
| Sodium formaldehyde sulfoxylate | 10.64 | 0.14 |
| Deionized water | 31.90 | 0.42 |
| Anionic surfactant * | 10.63 | 0.14 |

* ABEX JKB ™

The final dispersion had a cone and plate viscosity (Brookfield Model DVII) of 6,000 cps at 100 rpm (75° F.) and 300,000 at 1 rpm (75° F.). Fully coalesced and dried films of this dispersion showed two separate glass transition temperatures as in Example 1. The particle size distribution of this dispersion was typically bimodal with one mode centered at 0.4 to 0.7 microns and the second mode centered at 2 to 4 microns.

Example 3

This example used the same carboxylated latex and monomer blend as Example 1 and 2 but went to still higher solids. General Procedure A was used for polymerization and the recipe is in Table III.

TABLE III

| 87.17 Percent Solids Acrylate Polymer | | |
|---|---|---|
| REAGENT | WEIGHT (g) | WEIGHT (%) |
| Latex (67.3% solids) | 4545 | 36.26 |
| Ammonium hydroxide (29–30 wt. %) | 21.5 | 0.17 |
| Deionized water | 21.5 | 0.17 |
| Lauryl mercaptan | 7.9 | 0.06 |
| t-Amyl peroxyneodecanoate | 31.2 | 0.25 |
| Ethyl acrylate | 3877 | 30.92 |
| Butyl acrylate | 3877 | 30.92 |
| t-Butyl hydroperoxide | 14.3 | 0.11 |
| Sodium formaldehyde sulfoxylate | 28.6 | 0.23 |
| Deionized water | 85.8 | 0.68 |
| Anionic surfactant * | 28.6 | 0.23 |

* ABEX JKB ™

The final dispersion has a cone and plate viscosity (Brookfield Model DVII) of <10,000 cps at 100 rpm (75° F.) and >100,000 at 1 rpm (75° F.). The polymer exhibits good long term storage stability. The polymer was easily spread into thin films. The particle size distribution of this dispersion was typically trimodal with one mode centered at 0.4 to 0.7 microns, one mode centered at 2 to 4 microns and a third mode centered at 8 to 30 microns. Fully coalesced and dried films of this dispersion show two separate glass transition temperatures as in Examples 1 and 2.

A similar latex to Example 3 was made using the same procedure and recipe but substituting as the starting latex Rhoplex™ 2620 (commercially available latex) from Rohm and Haas at 62 weight percent solids and having a monomer composition similar to Carbobond™. The resulting polymer dispersion had 85.8 weight percent solids and a viscosity at a pH of 6 similar to Example 3.

Another similar latex to Example 3 was made using the same procedure and recipe but substituting as the starting latex Acronal V275™ from BASF at 65 weight percent solids and having a monomer composition similar to Carbobond™ plus a few weight percent acrylonitrile. The resulting polymer dispersion had 86.5 weight percent solids and a viscosity at a pH of 6 similar to Example 3.

Example 4

An example of a polymerization using only butyl acrylate in the second added monomer is shown in Table IV. This polymerization used the same starting latex as in examples 1, 2 and 3. Also, the General Procedure A as in Examples 1, 2 and 3 was used and the recipe is given in Table IV.

TABLE IV

| 79% Solids Acrylate Polymer | | |
|---|---|---|
| REAGENT | WEIGHT (g) | WEIGHT (%) |
| Latex (67.3% solids) | 4545 | 61.38 |
| Ammonium hydroxide (29–30 wt. %) | 21.5 | 0.29 |
| Deionized water | 21.5 | 0.29 |
| Lauryl mercaptan | 2.9 | 0.04 |
| t-Amyl peroxyneodecanoate | 11.6 | 0.16 |
| Butyl acrylate | 2744 | 37.06 |
| t-Butyl hydroperoxide | 5.3 | 0.07 |
| Sodium formaldehyde sulfoxylate | 10.6 | 0.14 |
| Deionized water | 32.0 | 0.43 |
| Anionic surfactant * | 10.6 | 0.14 |

* ABEX JKB ™

The final dispersion had a cone and plate viscosity (Brookfield Model DVII) of 6,100 cps at 100 rpm (75° F.) and 70,000 cps at 1 rpm (75° F.). The particle size distribution of the dispersion was typically trimodal with one mode centered at 0.4 to 0.7 microns, another mode centered at 2 to 4 microns and a third mode centered at 8 to 30 microns. Fully coalesced and dried films of this dispersion show two separate glass transition temperatures, one at −21° to −23° C. which is characteristic of the starting latex and another at −45° to −53° C. which is characteristic of polybutyl acrylate. Dried films of this dispersion exhibit both the low temperature flexibility expected of a material such as polybutylacrylate with a Tg of −45° to −53° C. as well as the lower tack surface associated with a higher Tg polymer such as the starting latex.

The micrographs of FIG. 1 show a series of wet polymer dispersions prepared similarly to Examples 1–4 that have been sandwiched between two microscope slides. These polymers were not diluted. This micrographs show the range in particle size distribution and morphology that can be achieved in the pH and solids range shown by samples A–K in the following Table V.

TABLE V

| SAMPLE | pH | WEIGHT PERCENT SOLIDS |
|---|---|---|
| A | 61 | 5.95 | 85.5 |
| B | 64 | 5.95 | 88.0 |
| C | 66 | 6.8 | 88.0 |
| D | 67 | 5.1 | 83.0 |
| E | 68 | 5.95 | 85.5 |
| F | 69 | 5.1 | 88.0 |
| G | 70 | 5.95 | 88.0 |
| H | 71 | 5.1 | 85.5 |
| I | 72 | 5.1 | 88.0 |
| J | 73 | 6.8 | 83.0 |
| K | 74 | 5.1 | 85.5 |

Example 5

An example of a polymerization using a vinyl acetate copolymer starting latex is illustrated in Table VI. General Procedure A was used for making this polymer. The latex used in this example is a commercially available ethylene-vinyl acetate copolymer latex manufactured by Air Products, Inc. The latex has a trade name of Airflex® 500. This latex had a solids content of 55% by weight, a pH of 4.9 as received and a Tg of 5° C.

TABLE VI

82.3 Percent Solids Vinyl Acetate - Acrylate Polymer

| REAGENT | WEIGHT (g) |
|---|---|
| Airflex ® 500 (pH adjusted to 5.6) (vinyl acetate latex) | 4550 |
| Lauryl mercaptan | 7.3 |
| Ethyl acrylate | 3750 |
| Butyl acrylate | 3750 |
| t-Amyl peroxy neodecanoate | 22.8 |
| t-Butyl hydroperoxide | 14.3 |
| Sodium formaldehyde sulfoxylate | 28.6 |
| Anionic surfactant/deionized water (1 part surfactant/4 parts water) | 120 |

The final dispersion had a solids content of 82.3% by weight. This dispersion had a cone and plate viscosity (Brookfield Model No. DVII) of less than 20,000 cps at 50 rpm (75° F.) and less than 1,000,000 cps at 1 rpm (75° F.)

Example 6

A polymer dispersion was prepared using a polyvinyl chloride copolymer latex as the starting material. The polyvinyl chloride copolymer latex was Vycar™ 450X61 having a Tg of about 20° C. The General Procedure A was modified as below. The recipe is given in Table VII.

A 50:50 mixture of deionized water ad concentrated ammonium hydroxide (29–30 wt. % NH3) was prepared and added dropwise until the pH of the latex was equal to 9.0. The latex was then added to the reactor and stirred at 200 rpm under nitrogen. A 1 liter jacketed resin kettle was used as the reactor. The reaction temperature was controlled using an external heating/cooling bath to circulate water through the resin kettle jacket. A low speed, high torque electrically powered stirrer equipped with an anchor-type blade was used for agitation. Triton™ X405 (6.0 g) was added dropwise to the stirred latex. Triton™ X405 is a poly (oxyethylene) polymeric nonionic surfactant available from Rohm & Haas Co., Philadelphia, Pa. Then a monomer mixture of isooctyl 3-mercaptopropionate (0.35 g), Lupersol™ 546M75 (1.41 g) and butyl acrylate (353 g) was prepared. A portion of the monomer mixture (60 g) was added to the stirred latex. The resulting mixture was heated to approximately 80° C. The remainder of the monomer mixture was then added dropwise over a 75 minute period. During this time the temperature of reaction mixture was maintained between 78° C. and 82° C. After the addition of the monomer mixture was complete, the reaction was allowed to stir 15 minutes more. Then t-butyl hydroperoxide (0.71 g) was added and the mixture was cooled to 44° C. A solution of sodium formaldehyde sulfoxylate (1.28 g), Abex JKB (1.28 g) and deionized water (3.83 g) was then added. The reaction temperature was maintained between 40° C. and 45° C. for 1 hour more before cooling to room temperature.

TABLE VII

80% Solids Polymer Using Vinyl Chloride Copolymer Latex

| REAGENT | WEIGHT (g) | WEIGHT (%) |
|---|---|---|
| Vycar ™ 450X61 emulsion (polyvinyl chloride copolymer, Tg +20 C.) | 247 | 40.17 |
| Triton ™ X405 | 6.0 | 0.98 |
| Lupersol ™ 546M75 (t-amyl peroxyneodecanoate, 75 wt. %, with mineral spirits, 25 wt. %) | 1.41 | 0.23 |
| Butyl acrylate | 353 | 57.41 |
| Isooctyl 3-mercaptopropionate | 0.35 | 0.06 |
| t-Butyl hydroperoxide | 0.71 | 0.12 |
| Sodium formaldehyde sulfoxylate | 1.28 | 0.21 |
| Abex JKB | 1.28 | 0.21 |
| Deionized water | 3.83 | 0.62 |

Total solids of the final dispersion were 80.0%. The final dispersion had a cone and plate viscosity (Brookfield Model DVII) of 32,000 cps at 20 rpm (75 F.) and 281,000 cps at 1 rpm (75 F.). Particle size analysis was run using a Coulter LS230. The particle size distribution trimodal and the mean particle size was 3.1 microns.

Another vinyl chloride copolymer latex Vycar™ 460x49 having 52.7% initial solids and a Tg of 42° C., available from B.F. Goodrich Chemical Co., was used as a starting latex with a similar recipe. That polymerization resulted in 80.2 wt. % solids, a viscosity of 21,000 cps at 20 rpm (75° F.) and 130,000 cps at 1 rpm (75° F.), and a mean particle diameter of 1.4 microns.

Example 7

This example used a polyurethane latex as the starting latex and n-butyl acrylate as the monomer. The polyurethane was Sancure™ 2026 available from B.F. Goodrich Chemical Co. The procedure is set forth below.

150 g Sancure™ 2026, 22.5 g Santicizer™ 160 and 3.5 g Triton X405 were charged to a 1 liter resin kettle and heated to 75° C. with an agitation rate of 150 rpm. At 75° C., the monomer feed containing 300 g of n-butyl acrylate, 0.3 g IOMP (iso-octyl 3-mercaptopropionate) and 1.2 g Lupersol 546M75 (t-amyl peroxyneodecanoate) was added dropwise via an FMI pump over 90 minutes. Upon complete addition of monomer, the polymerization contents were held at 75° C. for 15 minutes then cooled to 40° C. At 50° C., 0.57 g of t-butyl hydroperoxide was charged. Once the reaction temperature reached 40° C., a solution containing 1.14 g sodium formaldehyde sulfoxylate, 3.42 g deionized water and 1.14 g ABEX JKB™ was added. The polymerization contents were stirred an additional 60 minutes and then cooled to 25° C. The resulting polymer was creamy and smooth in appearance and texture. %TS=80. The particle size distribution was trimodal with peaks at about 0.4, 1.7 and 7 microns.

Santicizer 160 is a butyl benzylphthalate plasticizer for various polymers available from Monsanto Co., in St. Louis, Mo.

Another polymerization was run identically except no Santicizer 160 was added to the starting Sancure™ 2026. The resulting polymer was more viscous than Example 7 but still had a smooth creamy texture and appearance. %TS= 77.8. The particle size distribution was bimodal with peaks at about 0.3 and 2 microns.

Example 8

A high solids polymer dispersion was made using a poly(vinylidene chloride) copolymer latex (Vycar™

660X14 available from the B.F. Goodrich Co.). The starting latex had 47.8 wt. % solids and a Tg of 7° C. General Procedure A was modified as set forth below. The recipe is given in Table VIII.

A 50:50 mixture of deionized water and concentrated ammonium hydroxide (29–30 wt. % NH3) was prepared and added dropwise to the latex with vigorous stirring until the pH of the latex was equal to 9.0. The latex was then added to the reactor and stirred at 200 rpm under nitrogen. A 1 liter jacketed resin kettle was used as the reactor. The reaction temperature was controlled using an external heating/cooling bath to circulate water through the resin kettle jacket. A low speed, high torque electrically powered stirrer equipped with an anchor-type blade was used for agitation. Triton X405 was added dropwise to the stirred latex. Then a monomer mixture of isooctyl 3-mercaptopropionate, Lupersol™ 546M75 and butyl acrylate was prepared. A portion of the monomer mixture (60 g) was added to the stirred latex. Then the resulting mixture was heated to approximately 80° C. The remainder of the monomer mixture was then added dropwise over a 60 minute period. During this time the temperature of reaction mixture was maintained between 78 C. and 82 C. After the addition of the monomer mixture was complete, the reaction was allowed to stir 15 minutes more. Then t-butyl hydroperoxide was added and the mixture was cooled to 43 C. A solution of sodium formaldehyde sulfoxylate Abex JKB and deionized water (4.16 g) was then added. The reaction temperature was maintained between 40 C. and 45 C. for 1 hour more before cooling to room temperature.

TABLE VIII

80% Solids Polymer Using Poly(Vinylidene Chloride) Copolymer Latex

| REAGENT | WEIGHT (g) | WEIGHT (%) |
| --- | --- | --- |
| Vycar ™ 660X14 latex Tg = 7C | 213 | 34.60 |
| Triton ™X405 (Surfactant) | 6.0 | 0.97 |
| Lupersol ™ 546M75 (t-amyl peroxyneodecanoate, 75 wt. %, with mineral spirits, 25 wt. %) | 1.55 | 0.25 |
| Butyl acrylate | 387 | 62.86 |
| Isooctyl 3-mercaptopropionate | 0.39 | 0.06 |
| t-Butyl hydroperoxide | 0.78 | 0.13 |
| Sodium formaldehyde sulfoxylate | 1.39 | 0.23 |
| Abex JKB | 1.39 | 0.23 |
| Deionized water | 4.16 | 0.68 |

Total solids of the final dispersion were equal to 79.6%. The final dispersion had a cone and plate viscosity (Brookfield Model DVII) of 3,700 cps at 20 rpm (75 F.) and 25,000 cps at 1 rpm (75 F.). Particle size analysis was run using a Coulter LS230. The mean particle size was 1.4 microns.

GENERAL PROCEDURE B

The starting latex adjusted to the appropriate pH (e.g., 6.0) was added to a reactor and stirred under nitrogen at 75 rpm. In a typical lab preparation a 2 liter jacketed resin kettle was used as the reactor. A low speed, high torque electrically powered stirrer equipped with an anchor type blade was used for agitation. The temperature was controlled using an external heating/cooling bath which circulates water through the resin kettle jacket. The latex was heated to the reaction temperature, usually 77° C. (depending upon the monomer/initiator system) and a solution of iso-octyl mercaptopropionate, t-amyl peroxyneodecanoate and the monomer was added over a few hours. The reaction temperature was maintained throughout the addition. Twenty to sixty minutes after the addition was complete, t-butyl hydroperoxide (TBHP) was added and cooling was begun. The TBHP was the first half of the red-ox scavenging system used to reduce the level of unreacted free monomer to an acceptable level. When the batch temperature reached 40° C., a solution of 20 wt. % sodium formaldehyde sulfoxylate, 20% wt. % anionic surfactant, and 60 wt. % deionized water was added. The sodium formaldehyde sulfoxylate catalyzes the t-butyl hydroperoxide causing it to form free-radical containing species which react with any residual free monomer. The batch was stirred for 1 hour more at 40° C. during which time the residual monomer was scavenged (consumed), and then cooled to room temperature and removed from the reactor.

The glass transition temperatures (Tg) for the dried films of the final product dispersions were determined using a differential scanning calorimeter (DSC) at a heating rate of 20° C./min. The actual DSC instrument used was either a Perkin Elmer Model DSC7, or a Mettler DSC-30.

Examples 9 through 11 utilize the same monomer, n-butyl acrylate, but different starting latex media. The latex is a styrene-butadiene latex or a carboxylated nitrile latex or a non-carboxylated nitrile latex which is then blended with Carbobond™ XPD-2254 latex in a 50/50 weight ratio. To this latex blend, about 0.3% (by weight) of an anionic surfactant was also added, before the latex media was charged into the reactor. The pH of the latex media was adjusted to 6.0 or above before the polymerization was started.

Example 9

This example used a carboxylated styrene-butadiene latex, Good-rite® 2570X59 having a Tg of −20° C. available from the B.F. Goodrich Company at about 52% weight solids. It was blended with the acrylic latex Carbobond™ XPD-2254 in a 50/50 weight ratio. An anionic surfactant was added at 0.3 weight % based on the total solids of this latex blend, before it was used as the starting media for polymerization of n-butyl acrylate. The polymerization was conducted according to General Procedure B. Table IX sets forth the recipe.

TABLE IX 81.7% Solids Polymer Using a Carboxylated Styrene-Butadiene Latex as 50 wt. % of the Starting Latex

| REAGENT | WEIGHT (g) | WEIGHT (%) |
| --- | --- | --- |
| Latex blend: Good rite ® 2570X59 + XPD-2254 + anionic surfactant | 750.00 | 52.90 |
| n-Butyl acrylate | 654.50 | 46.16 |
| t-Amyl peroxyneodecanoate (Lupersol 546M75) | 2.10 | 0.15 |
| iso-Octyl 3-mercaptopropionate | 0.53 | 0.04 |
| t-Butyl hydroperoxide | 1.09 | 0.08 |
| Sodium formaldehyde sulfoxylate | 1.90 | 0.13 |
| Abex JKB ™ | 1.91 | 0.13 |
| Deionized water | 5.76 | 0.41 |

The final dispersion has a bimodal particle size distribution with one mode centered at about 1 to 2 microns and another at about 20 to 30 microns. Fully coalesced and dried films of this dispersion exhibited one glass transition temperature (Tg) at about −41° C., and another at about −14° C.

Example 10

This example is similar to Example 9 above, with the styrene-butadiene latex replaced with a carboxylated nitrile latex, Hycar® 1572, having a Tg of −27° C. available from the B.F. Goodrich Company at about 50% weight solids. It was blended with the acrylic latex Carbobond™ XPD-2254 in a 50/50 weight ratio. An anionic surfactant was added at 0.3 weight % based on the total solids of this latex blend, before it was used as the starting media for polymerization of n-butyl acrylate. General Procedure B was used for polymerization.

TABLE X 81.8% Solids Polymer Using a Carboxylated Nitrile Latex as 50 wt. % of the Starting Latex

| REAGENT | WEIGHT (g) | WEIGHT (%) |
|---|---|---|
| Latex blend: Hycar ® 1572 + XPD-2254 + anionic surfactant | 518.89 | 43.23 |
| n-Butyl acrylate | 664.50 | 55.37 |
| t-Amyl peroxyneodecanoate (Lupersol 546M75) | 2.66 | 0.22 |
| iso-Octyl 3-mercaptopropionate | 0.66 | 0.06 |
| t-Butyl hydroperoxide | 1.33 | 0.11 |
| Sodium formaldehyde sulfoxylate | 2.39 | 0.20 |
| Abex JKB ™ | 2.39 | 0.20 |
| Deionized water | 7.18 | 0.60 |

The final dispersion has a bimodal particle size distribution with one mode centered at about 0.3 microns and another at about 1 to 2 microns. Fully coalesced and dried films of this dispersion exhibited one glass transition temperature (Tg) at about −49° C., and another at about −19° C.

Example 11

This example is similar to Example 10 above, instead using a non-carboxylated nitrile latex. Hycar® 1572x64, having a Tg of −30° C. is available from the B.F. Goodrich Company at about 47 weight solids. It was blended with the acrylic latex Carbobond™ XPD-2254 in a 50/50 weight ratio. An anionic surfactant was added at 0.3 weight % based on the total solids of this latex blend, before it was used as the starting media for polymerization of n-butyl acrylate. General Procedure B was used for the polymerization.

TABLE XI 81.8% Solids Polymer Using a Non-carboxylated Nitrile Latex as 50 wt. % of the Starting Latex

| REAGENT | WEIGHT (g) | WEIGHT (%) |
|---|---|---|
| Latex blend: Hycar ® 1572X64 + XPD-2254 + anionic surfactant | 494.90 | 41.24 |
| n-Butyl acrylate | 687.90 | 57.33 |
| t-Amyl peroxyneodecanoate (Lupersol 546M75) | 2.75 | 0.23 |
| iso-Octyl 3-mercaptopropionate | 0.69 | 0.06 |
| t-Butyl hydroperoxide | 1.38 | 0.11 |
| Sodium formaldehyde sulfoxylate | 2.48 | 0.21 |
| Abex JKB ™ | 2.48 | 0.21 |
| Deionized water | 7.43 | 0.62 |

The final dispersion has a multimodal particle size distribution with one mode centered at about 0.5 to 1.0 microns, another mode at 3 to 4 microns, and one mode at 150 to 200 microns. Fully coalesced and dried films of this dispersion exhibited one glass transition temperature (Tg) at about −43° C., and another at about −23° C. When the particle size distribution of Examples 11 and 10 are compared it can be seen that the carboxylated latex provides a smaller diameter particle distribution on average.

Examples 12 through 16 utilize different monomers or monomer combinations, using the same starting latex, which is the carboxylated acrylic latex, Carbobond™ XPD-2254, available from the B.F. Goodrich Company, at a solids content of about 67 weight percent.

Example 12

In this example, the monomers comprised 15 wt. % styrene and 85 wt. % n-butyl acrylate. The starting latex media was the carboxylated acrylic latex (Carbobond™ XPD-2254) having a solids content of about 67 weight percent and a pH of about 2 and viscosity of about 200 cP. General Procedure B was used for the polymerization. Before polymerization, the latex pH was raised to about 6.0 via a slow addition of the necessary amount of an ammonium hydroxide solution. The monomer mixture contains styrene and n-butyl acrylate in a 15/85 ration, to which the iso-octyl 2-mercaptopropionate and t-amyl peroxyneodecanoate (initiator) were added. The addition of this monomer and additives stream was carried out at 77° C. over 4 hours, followed by agitation of the batch at the same temperature for 1 hour, before the TBHP was added and the scavenging was performed.

TABLE XII 82.5% Solids Polymer Using 15% Styrene Monomer Stream

| REAGENT | WEIGHT (g) | WEIGHT (%) |
|---|---|---|
| Latex (67.2% solids) | 660.00 | 54.90 |
| n-Butyl acrylate | 448.80 | 37.33 |
| Styrene | 79.20 | 6.59 |
| t-Amyl peroxyneodecanoate Lupersol ™ 546M75 | 3.17 | 0.26 |
| iso-Octyl 3-mercaptopropionate | 0.53 | 0.04 |
| t-Butyl hydroperoxide | 1.06 | 0.09 |
| Sodium formaldehyde sulfoxylate | 1.90 | 0.16 |
| Abex JKB ™ | 1.90 | 0.16 |
| Deionized water | 5.70 | 0.47 |

The final dispersion has a multimodal particle size distribution with one mode centered at 1 to 3 microns and another mode centered at 30 to 40 microns. Fully coalesced and dried films of this dispersion exhibited one prominent glass transition temperature (Tg) at about −19° C. characteristic of acrylate copolymers, and another faint Tg at about +71° C. characteristic of styrene-rich copolymers.

Example 13

This example used the same latex and is nearly identical to Example 12, except that the 15 wt. % styrene monomer was replaced by 15 wt. % acrylonitrile. The addition of this monomer stream (including additives) was carried out over 3 hours, followed by agitation of the batch at the same temperature for 20 minutes, before the TBHP was added and the scavenging was performed.

TABLE XIII 81.2% Solids Polymer Using 15%
Acrylonitrile in the Monomer Stream

| REAGENT | WEIGHT (g) | WEIGHT (%) |
|---|---|---|
| Latex (67.2% solids) | 660.00 | 54.95 |
| n-Butyl acrylate | 448.80 | 37.36 |
| Acrylonitrile | 79.20 | 6.59 |
| t-Amyl peroxyneodecanoate Lupersol ™ 546M75 | 2.11 | 0.18 |
| iso-Octyl 3-mercaptopropionate | 0.53 | 0.04 |
| t-Butyl hydroperoxide | 1.06 | 0.09 |
| Sodium formaldehyde sulfoxylate | 1.90 | 0.16 |
| Abex JKB ™ | 1.90 | 0.16 |
| Deionized water | 5.70 | 0.47 |

The final dispersion has a multimodal particle size distribution with one mode centered at 2 to 3 microns and another mode centered at 30 to 40 microns. Fully coalesced and dried films of this dispersion exhibited two glass transition temperatures (Tg) at −39° C. and −15° C., characteristic of acrylate copolymers, and another faint Tg at about +34° C. characteristic of acrylonitrile-rich copolymers.

Example 14

This example used the same latex and procedure as Example 12 and the monomer mixture contained vinylidene chloride and n-butyl acrylate in a 50/50 ratio, to which the iso-octyl-3-mercaptopropionate and a thermal initiator were added. The addition of this monomer stream was carried out at 40° C. (instead of 77° C.) over 3 hours, followed by agitation of the batch at the same temperature for 20 minutes, before the TBHP was added and the scavenging was preformed.

TABLE XIV 81.5% Solids Polymer Using 50%
Vinylidene Chloride in the Monomer Stream

| REAGENT | WEIGHT (g) | WEIGHT (%) |
|---|---|---|
| Latex (67.2% solids) | 698.09 | 54.75 |
| n-Butyl acrylate | 279.24 | 21.90 |
| Vinylidene chloride | 279.24 | 21.90 |
| 3-Hydroxy-1,1-dimethylbutyl peroxyneodecanoate (Lupersol 610M50) | 6.70 | 0.53 |
| iso-Octyl 3-mercaptopropionate | 0.56 | 0.04 |
| t-Butyl hydroperoxide | 1.12 | 0.09 |
| Sodium formaldehyde sulfoxylate | 2.01 | 0.16 |
| Abex JKB ™ | 2.01 | 0.16 |
| Deionized water | 6.03 | 0.47 |

The final dispersion has a multimodal particle size distribution with one mode centered at about 0.5 microns and another mode centered at about 2 microns. Fully coalesced and dried films of this dispersion exhibited one glass transition temperature (Tg) at −17° C., characteristic of acrylate copolymers, and another Tg at about +5° C., characteristic of vinylidene chloride containing copolymers.

This example was repeated using a monomer mixture with vinylidene chloride and n-butyl acrylate in a 55:45 weight ratio. The final solids content was 81.2 wt. %. The particle size distribution had a peak at 2 μm and a shoulder at 0.4 μm. Glass transition temperatures were measured at −13° C. and +14° C.

Example 15

This example used the same latex and procedure as Example 12 and the sole monomer was n-lauryl methacrylate. The monomer (and additives) stream was added to the reactor over 4 hours, followed by continued agitation for another 30 minutes, before the TBHP was added for starting the monomer scavenging step.

TABLE XV 81.3% Solids Polymer Using 100%
n-Lauryl Methacrylate Monomer

| REAGENT | WEIGHT (g) | WEIGHT (%) |
|---|---|---|
| Latex (67.2% solids) | 660.00 | 54.85 |
| n-Lauryl methacrylate | 528.00 | 43.88 |
| t-Amyl peroxyneodecanoate Lupersol ™ 546M75 | 4.22 | 0.35 |
| iso-Octyl 3-mercaptopropionate | 0.53 | 0.04 |
| t-Butyl hydroperoxide | 1.06 | 0.09 |
| Sodium formaldehyde sulfoxylate | 1.90 | 0.16 |
| Abex JKB ™ | 1.90 | 0.16 |
| Deionized water | 5.70 | 0.47 |

The final dispersion has a broad and multimodal particle size distribution with one mode centered at about 15 to 20 microns, another at about 30 microns and a shoulder at about 2 microns. Fully coalesced and dried films of this dispersion exhibited one broad glass transition temperature (Tg) ranging from about −50° C. to about 0° C.

Example 16

This example used the same latex as Example 12 and the monomers were n-lauryl methacrylate and 2-ethylhexyl methacrylate in a 50/50 weight ratio, to which the iso-octyl mercaptopropionate and t-amyl peroxyneodecanoate (initiator) were added. General Procedure B was used for the polymerization. This monomer stream was added to the reactor over 3 hours. An additional 1.00 gm of the initiator was mixed in with the monomer stream when the monomer level in its reservoir contained only 100 mls. At the end of the 3 hour monomer addition period, the temperature was raised to 80° C., and the agitation continued for another hour. The TBHP was then added and the reactor cooled down to 40° C. for the monomer scavenging step.

TABLE XVI 81.0% Solids Polymer Using n-Lauryl Methacrylate
and 2-Ethylhexyl Methacrylate Monomers in a 50/50 Ratio

| REAGENT | WEIGHT (g) | WEIGHT (%) |
|---|---|---|
| Latex (67.2% solids) | 660.00 | 54.80 |
| n-Lauryl methacrylate | 264.00 | 21.92 |
| 2-Ethylhexyl methacrylate | 264.00 | 21.92 |
| Lupersol ™ 546M75 | 4.22 | 0.35 |
| iso-Octyl 3-mercaptopropionate | 0.53 | 0.04 |
| t-Butyl hydroperoxide | 1.00 | 0.08 |
| Additional shot of Lupersol 546M75 | 1.06 | 0.09 |
| Sodium formaldehyde sulfoxylate | 1.90 | 0.16 |

TABLE XVI-continued 81.0% Solids Polymer Using n-Lauryl Methacrylate
and 2-Ethylhexyl Methacrylate Monomers in a 50/50 Ratio

| REAGENT | WEIGHT (g) | WEIGHT (%) |
|---|---|---|
| Abex JKB ™ | 1.90 | 0.16 |
| Deionized water | 5.70 | 0.47 |

The final dispersion has a broad and multimodal particle size distribution with one mode centered at about 2 to 3 microns, another at about 6 microns and a shoulder at about 0.4 microns. Fully coalesced and dried films of this dispersion exhibited one broad glass transition temperature (Tg) ranging from about −50° C. to about 0° C.

Example 17

A typical sealant formulation using a dispersion of polymer particles of this disclosure is shown below:

TABLE XVII

| INGREDIENT | WEIGHT IN FORMULATION | WEIGHT % |
|---|---|---|
| Polymer Particle Dispersion (85% Solids) | 2500 g | 93.04 |
| Fungicide | 2.5 g | 0.09 |
| Ethylene Glycol | 27.0 g | 1.00 |
| Propylene Glycol | 27.0 g | 1.00 |
| Mineral Oil | 116.0 g | 4.32 |
| Epoxy Silane | 9.4 g | 0.35 |
| Mildewcide | 5.0 | 0.19 |

The sealant was formulated using a planetary mixer having a working capacity of about ¾ gallons, and capable of handling viscous, thixotropic materials with having vacuum mixing capability. The mixer used had variable mixing speeds from 40 to 200 rpm. The dispersion of polymer particles, fungicide and glycols was added to the mixer and mixed until uniform, usually from 5–10 minutes. The mineral oil, epoxy silane and mildewcide were then added and mixed until uniform. The pH of the batch was then adjusted with a mixture of 50/50 concentrated ammonia/deionized water to the desired final batch pH which was typically between 6.5 to 8.0. The material was then mixed with vacuum for 20 minutes to remove any air from the sealant. The material was then packaged into cartridges.

Example 18

Several examples from U.S. Pat. No. 4,130,523 ('523) were prepare to compare the viscosity values generated at different solids contents to the viscosities generated by the method of this disclosure. The viscosities are shown below.

TABLE XVIII

| Wt. % Solids | '523 Ex. 1 pH = 6.4 | '523 Ex. 2 | Method of this Disclosure pH = 6.0 | Method of this Disclosure pH = 6.0 | Method of this Disclosure pH = 9 |
|---|---|---|---|---|---|
| 52 | | | 52 | | |
| 57 | 1,000 cps | | 55 | | |
| 58.6 | | | | | 59 |
| 62 | | | 79 | | |
| 63 | 5,000 cps | | | | |
| 63.9 | | 1,460 | | | |
| 67 | | | | 118 | 241 |
| 68.4 | 11,000 | | | | 444 |
| 72 | | 18,000 | 314 | | |
| 77 | | | 750 | | |
| 82 | | | 12,700 | | |
| 85.5 | | | 50,000 | | |

Viscosities @ 24° C., 20 rpm with a cone and plate viscometer.

The dispersion of polymer particles is useful as a source of bulk polymer or as an alternative to a conventional latex. It may be used for molding or forming operations, as a thixotropic material for flexible membranes or in coatings or in sealants. The dispersion can be used as a saturant or binder for paper, textiles or nonwovens. It may be used as an adhesive formulation or in coatings such as carpet backing. It can be formulated with the recited additives and further with pigments, defoamers, coalescing agents, flow modifiers, etc. A formulated sealant from the dispersion of polymer particles is useful as a thixotropic material for flexible membranes or coatings, or as a thixotropic sealant or caulk. The caulk is useful in residential or commercial construction or maintenance. It functions to seal interstices either in a structural material or between two or more structural materials or functions to fill expansion joints in concrete or other building structures.

The caulking compounds and sealants according to the invention may be gunned or extruded or otherwise formed into various profiles with conventional equipment such as caulking guns and caulking tubes. They can be formulated desirably to have volume shrinkage values from about 5 to 30%, and more desirably from 8 to 20%.

These caulking compounds have lower shrinkage, high elongation, low modulus, good adherence to a variety of substrates, and a fast dry to a low tack surface. They are non-staining and form a dried caulk that is easily coated with traditional latex or oil-based commercial coatings.

While in accordance with the Patent Statutes, the best mode and preferred embodiment has been set forth, the scope of the invention is not limited thereto, but rather by the scope of the attached claims.

What is claimed is:

1. A high solids polymer dispersion comprising:
   at least 77 weight percent discrete polymer particles being comprised of the reaction product from polymerizing at least one unsaturated monomer in the presence of a latex, said discrete polymer particles having a particle size distribution having at least 2 modes with one mode having particle diameters of less than 1 μm and one mode greater than 1 μm and wherein at least 70 wt. % of the total polymers of said polymer dispersion have a Tg of 0° C. or less and are substantially noncrystalline.

2. A high solids polymer dispersion according to claim 1, wherein at least 20 wt. % of said particles of said dispersion have a diameter above 1 μm.

3. A high solids polymer dispersion according to claim 2, wherein a dried film of said dispersion has at least a first and a second Tg value as measured by differential scanning calorimetry with heating at 20° C. per minute and wherein said second Tg value varies from said first Tg value by from 2° C. to 100° C., and one of said Tg values being characteristic of the dispersed polymer from the latex and one of said Tg values being characteristic of the polymer formed from said at least one unsaturated monomer.

4. A high solids polymer dispersion according to claim 3, wherein said latex is an acrylate latex, a urethane latex, a vinyl chloride copolymer latex, or a vinylidene chloride copolymer latex, or combinations thereof.

5. A high solids polymer dispersion according to claim 2, wherein said latex is a urethane latex formed from dispersing the reaction product of at least one polyol with at least one di or polyisocyanate compound.

6. A high solids polymer dispersion according to claim 3, wherein said latex includes an acrylate latex and said unsaturated monomers are at least 50 wt. % acrylate monomers having from 4 to 16 carbon atoms and/or vinyl acetate.

7. A high solids polymer dispersion according to claim 6, wherein said latex comprises at least 50 wt. % based on polymer solids of repeat units derived from acrylate monomers having from 4 to 16 carbon atoms.

8. A high solids polymer dispersion according to claim 6, wherein said latex comprises at least 50 wt. % based on polymer solids of repeat units derived from ethyl acrylate or butyl acrylate or combinations thereof and said at least one monomer polymerized in the presence of said latex comprises at least 50 wt. % ethyl acrylate or butyl or combinations thereof.

9. A high solids polymer dispersion according to claim 6, wherein said dispersion has at least 80 wt. % discrete polymer particles.

10. A high solids polymer dispersion according to claim 9, wherein said dispersion has from about 2 to about 20 wt. % polymer particles having diameters between 0.05 and 0.7 µm.

11. A high solids polymer dispersion according to claim 10, wherein at least 70 wt. % of the total polymers of said polymer dispersion have a Tg of −20° C. or less and are substantially noncrystalline polymers.

12. A high solids polymer dispersion according to claim 4, wherein at least 70 wt % of the total polymers of said polymer dispersion has a Tg of −20° C. or less and is a substantially noncrystalline polymer.

13. A high solids polymer dispersion according to claim 3, wherein said latex comprises up to 50 wt. % repeat units derived from one or more monomers of vinyl chloride; styrene or alkyl substituted styrene having from 6 to 12 carbon atoms; alkyl meth or ethacrylate having from 5 to 10 carbon atoms; or acrylonitrile or alkyl substituted acrylonitrile having from 3 to 8 carbon atoms or combinations thereof.

14. A high solids polymer dispersion according to claim 3, wherein said at least one unsaturated monomer comprises up to 25 wt. % of one or more monomers of vinyl chloride; styrene or alkyl substituted styrene having from 6 to 12 carbon atoms; alkyl meth or ethacrylate having from 5 to 10 carbon atoms; or acrylonitrile or alkyl substituted acrylonitrile having from 3 to 8 carbon atoms or combinations thereof.

15. A high solids polymer dispersion according to claim 13, wherein repeat units from said one or more monomers comprise at least 10 wt. % of said latex and wherein said unsaturated monomers polymerized in the presence of said latex are at least 10 wt. % monomers of vinyl chloride, styrene or alkyl substituted styrene having from 6 to 12 carbon atoms, alkyl meth or ethacrylate having from 5 to 10 carbon atoms, or acrylonitrile or alkyl substituted acrylonitrile having from 3 to 8 carbon atoms or combinations thereof.

16. A high solids polymer dispersion according to claim 3, wherein said latex comprises up to 85 wt. % of at least one monomer selected from the group consisting of vinylidene chloride and vinyl esters having from 4 to 10 carbon atoms.

17. A high solids polymer dispersion according to claim 3, wherein said unsaturated monomers comprise up to 65 wt. % of at least one monomer selected from the group consisting of vinylidene chloride and vinyl esters having form 4 to 10 carbon atoms.

18. A high solids polymer dispersion according to claim 16, wherein said latex comprises at least 10 wt. % based on the polymer solids of repeat units from the monomers of vinylidene chloride, or vinyl esters having from 4 to 10 carbon atoms or combinations thereof, and wherein at least 10 wt. % of said unsaturated monomers polymerized in the presence of said latex are vinylidene chloride or vinyl esters having from 4 to 10 carbon atoms or combinations thereof.

19. A high solids polymer dispersion comprising:
at least 77 wt. % discrete polymer particles being comprised of the reaction product from polymerizing at least one unsaturated monomer in the presence of a latex, said discrete polymer particles having a particle size distribution having at least two modes with one mode having particle diameters of less than 1 µm and one mode having particle diameters of greater than 1 µm and wherein the dynamic shear modulus of said discrete polymer particles recovered from said dispersion is about $10^6$ dyne/cm$^2$ or less at 20° C. as measured by parallel plate dynamic modulus method.

20. A high solids polymer dispersion according to claim 19, wherein at least 20 wt. % of said polymer particles of said dispersion have diameters above 1 µm and said modulus is from about $10^5$ dyne/cm$^2$ to about $10^6$ dyne/cm$^2$.

21. A high solids polymer dispersion according to claim 20, wherein said polymer particles of said dispersion have at least a first and second Tg value as measured by differential scanning calorimetry when heated at 10° C. per minute and wherein said second Tg value varies from said first Tg value by from 2° to 100° C., and one of said Tg values being characteristic of the dispersed polymer from the latex and one of said Tg values being characteristic of the polymer formed from the at least one unsaturated monomer.

22. A high solids polymer dispersion according to claim 21, wherein said latex is an acrylate latex, a urethane latex, a vinyl chloride copolymer latex, or a vinylidene chloride copolymer latex, or combinations thereof.

23. A high solids polymer dispersion according to claim 21, wherein said latex is a urethane formed from the reaction of at least one polyol with at least one di or polyisocyanate compound.

24. A high solids polymer dispersion according to claim 21, wherein said latex includes an acrylate latex and said at least one unsaturated monomer includes at least 50 wt. % acrylate monomers having from 4 to 16 carbon atoms and/or vinyl acetate.

25. A high solids polymer dispersion according to claim 24, wherein said dispersion has at least 80 wt. % discrete polymer particles.

26. A high solids polymer dispersion according to claim 25, wherein said dispersion has from about 2 to about 20 wt. % polymer particles having diameters between 0.05 and 0.7 µm.

27. A high solids polymer dispersion according to claim 26, wherein said latex comprises at least 50 wt. % based on polymer solids of repeat units derived from ethyl acrylate or butyl acrylate or combinations thereof and said monomers polymerized in the presence of said latex comprise at least 50 wt. % ethyl acrylate or butyl acrylate or combinations thereof.

\* \* \* \* \*